United States Patent
Ylinen et al.

(10) Patent No.: US 8,611,060 B2
(45) Date of Patent: Dec. 17, 2013

(54) CONTROL OF OPERATION OF PROTECTION RELAY

(75) Inventors: Juha Ylinen, Vaasa (FI); Kari Vanhala, Vähäkyrö (FI)

(73) Assignee: ABB Technology AG, Zürich (CH)

( * ) Notice: Subject to any disclaimer, the term of this patent is extended or adjusted under 35 U.S.C. 154(b) by 849 days.

(21) Appl. No.: 12/819,585

(22) Filed: Jun. 21, 2010

(65) Prior Publication Data

US 2010/0309596 A1    Dec. 9, 2010

Related U.S. Application Data (63) Continuation of application No. PCT/FI2007/050716, filed on Dec. 20, 2007.

(51) Int. Cl.
   *H02H 3/00* (2006.01)
   *H02H 3/08* (2006.01)
   *H02H 9/02* (2006.01)

(52) U.S. Cl.
   USPC .......................................... 361/78; 361/93.1

(58) Field of Classification Search
   USPC .......................................................... 361/78
   See application file for complete search history.

(56) References Cited

U.S. PATENT DOCUMENTS

| | | | |
|---|---|---|---|
| 5,751,532 A | 5/1998 | Kanuchok et al. | |
| 7,570,469 B2 * | 8/2009 | Guzman-Casillas et al. | ... 361/62 |
| 2004/0264074 A1 | 12/2004 | Schweitzer, III et al. | |
| 2006/0291120 A1 | 12/2006 | Guzman-Casillas et al. | |

OTHER PUBLICATIONS

International Search Report for PCT/FI2007/050716 completed Jul. 21, 2008.
Written Opinion for PCT/FI2007/050716 completed Jul. 21, 2008.

* cited by examiner

*Primary Examiner* — Dharti Patel
(74) *Attorney, Agent, or Firm* — Buchanan Ingersoll & Rooney PC (57) ABSTRACT

A method of controlling a protection relay, includes inputting an input characteristic quantity and determining a triggering condition for the protection relay using a calculation equation, the value of which increases when the input characteristic quantity exceeds a first threshold value, and decreases when the input characteristic quantity undershoots a second threshold value for an overfunction measure, and the value of the calculation equation increases when the input characteristic quantity undershoots a first threshold value, and decreases when the input characteristic quantity exceeds a second threshold value for an under function measure, wherein the calculation equation includes a first measure and a second measure, and the triggering occurs when the first measure is greater than the second measure.

16 Claims, 4 Drawing Sheets

CONTROL OF OPERATION OF PROTECTION RELAY

RELATED APPLICATION

This application claims priority as a continuation application under 35 U.S.C. §120 to PCT/FI2007/050716, which was filed as an International Application on Dec. 20, 2007, designating the U.S. The entire content of this application is hereby incorporated by reference in its entirety.

FIELD

The present disclosure relates to control of a protection relay, such as control of a protection relay operating in an electric network.

BACKGROUND INFORMATION

Relays can be used in protection of electric networks and devices, for instance. Relay protection functions can be implemented as constant-time functions, where the operation time is independent of the value of the characteristic measure, such as current, voltage or frequency. Alternatively, relay protection functions can be inverse-time dependent, when the operation time is inversely dependent on the magnitude of the measured signal.

The inverse-time based algorithm analysis can be based on the assumption that the current or overcurrent exceeding a set current threshold value or undercurrent undershooting a set current threshold value, is constant during the measurement time. This results in a simple analogy between theoretical calculations and implementation. However, in practice, fluctuation and variation in the characteristic measure magnitude level can result in a realized operation time of the device.

SUMMARY

A method of controlling a protection relay is disclosed, including inputting an input characteristic quantity, and determining a triggering condition for the protection relay based on a value of a calculation equation, wherein for an overfunction measure the value increases when the input characteristic quantity exceeds a first threshold value and decreases when the input characteristic quantity undershoots a second threshold value, wherein for an underfunction measure, the value of the calculation equation increases when the input characteristic quantity undershoots a first threshold value and decreases when the input characteristic quantity exceeds a second threshold value, wherein the calculation equation includes a first measure and a second measure, and wherein triggering occurs when the first measure is greater than the second measure A protection relay is disclosed, including means for inputting an input characteristic quantity, and means for determining a triggering condition for the protection relay based on a value of a calculation equation, wherein for an overfunction measure the value is configured to increase when the input characteristic quantity exceeds a first threshold value and to decrease when the input characteristic quantity undershoots a second threshold value, wherein for an underfunction measure the calculation equation is configured to increase when the input characteristic quantity undershoots a first threshold value and to decrease when the input characteristic quantity exceeds a second threshold value, wherein the calculation equation includes a first measure and a second measure, and wherein triggering occurs when the first measure is greater than the second measure.

BRIEF DESCRIPTION OF THE DRAWINGS

In the following the disclosure will be described in greater detail exemplary embodiments with reference to the attached drawings, in which.

DETAILED DESCRIPTION

Figure 1:
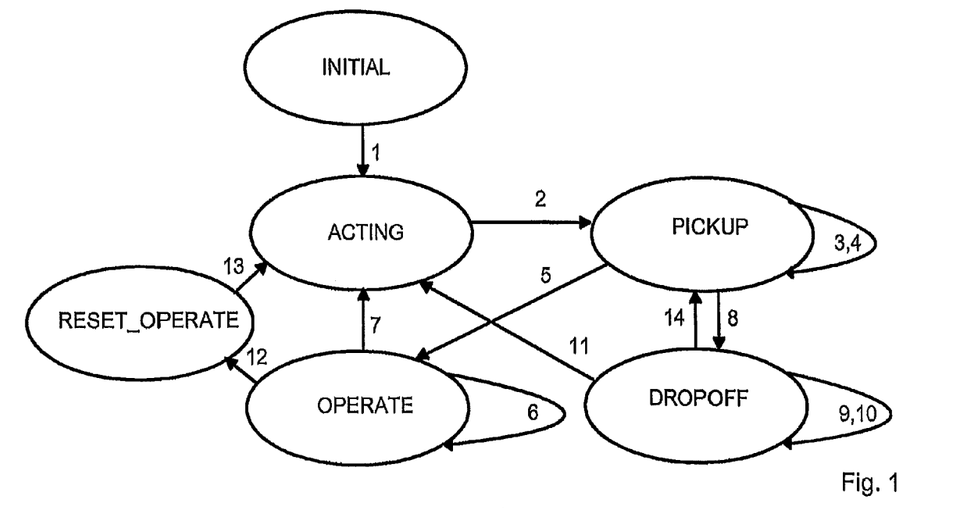
FIG. 1 shows an exemplary embodiment of a state diagram of an electronic device.

FIG. 1 shows a state diagram of an embodiment of a protection relay. The protection relay inputs a characteristic quantity, upon which operation decisions and different functionalities can be carried out in the protection relay. In the following figures and description, the characteristic quantity can be current but can also be some other measure, such as voltage, frequency, or temperature, for example. In the following, the disclosure is explained in respect of an overcurrent relay (i.e., the overfunction is overcurrent). The disclosure is not so limited and, for example, can be applied to an underfunction relay such as an undercurrent relay, in which case the operation is reverse to what is explained in the following.

In the simplified state diagram of FIG. 1, four states have been depicted. In INITIAL state, the device is not yet in use. When the device is taken into use, that is coupled to the system to be used, a state transition "1" to state ACTING is carried out. In state ACTING, the device can measure the characteristic quantity, on which the operation of the device is dependent. If the relay is responsive to an overfunction measure, such as overcurrent, the device can react on a current exceeding a threshold value of the current. An example of a relay responsive to an under function measure is an undercurrent relay, which will react on current undershooting a threshold value.

A state transition "2" from state ACTING to PICKUP depicts the situation where the current level exceeds a startup threshold value. In state transitions "3" and "4", the device is kept in PICKUP state. In "3", the nominator of equation 15 is increased but the nominator value does not yet exceed the denominator value. During this state transition, the value of the input variable is higher than the start-up threshold value.

A hysteresis region can be introduced around the startup threshold value, to help prevent undesired state transitions due to a current that oscillates around the startup threshold value. For overfunction, the hysteresis widens the signal range downwards, while for under function upwards. The state transition "4" describes a situation where the current is in the hysteresis region, which may be, for example 2% under the startup threshold value, for example, if 2% hysteresis has been set. Alternatively, the hysteresis region may extend to both sides of the startup threshold, which in the above example would give a +/−2% region.

The hysteresis setting may be a factory setting value, which can be determined based upon the transformer measurement inaccuracy and so forth. In an ideal case, from a pure algorithm point of view, hysteresis can even be set to zero but in practice it may be set to a value above zero. During this time, the equation 15 ratio can be freezed, that is it is neither increased nor decreased.

When the equation 15 nominator value finally exceeds the same equation denominator value, a state transition "5" PICKUP→OPERATE can be executed. State OPERATE can be kept as shown by arrow "6", while the signal stays above the startup threshold minus the hysteresis value.

If the input signal value drops below the startup threshold value minus the hysteresis value, the state can be changed to ACTING as indicated by arrow "7." Alternatively, a different hysteresis value than that used in PICKUP state may be used in OPERATE state to reset the operation back to ACTING. In another exemplary embodiment, a reset type equation can be used to do this. In this case, state RESET_OPERATE can first be reached with a state transition "12" and then the reset equation can be followed, which gradually decreases the equation 15 nominator to zero, causing the state change RESET_OPERATE→ACTING shown by arrow "13."

DROPOFF state can be reached from PICKUP state when the current falls under the threshold minus the hysteresis value as indicated by arrow "8".

In DROPOFF state, two internal state transitions 9 and 10 and the third transition 14 can be introduced. The first transition "9" describes the situation where the input signal lies in the hysteresis region with the result that the calculation of the nominator/denominator of equation 15 can be freezed, while the opposite state transition "14" follows if the signal magnitude exceeds the startup threshold value again. The state transition "10" describes the situation, where the input value is below the startup threshold value and outside the hysteresis region with the result that the equation 15 ratio value can being decreased while in this state.

If the equation 15 nominator value reaches 0, the device can be reset with the result that the device returns to state ACTING.

In the following, the operation is explained mathematically. Two separate equations can be defined for current relays: the operation equation (1) and the reset equation (5), also introduced by standards. They are dependent on the signal, (e.g., the characteristic measure quantity), so that the operate equation can only be valid for signal magnitude ratios (I versus I>) above the startup threshold value, while the reset equation can only be valid for signal magnitude ratios below the startup threshold value. The upper limit of the operate equation depends on the transformer dynamic measurement accuracy without saturation while the lower limit of the reset equation can be zero. Because the hysteresis region creates a natural "gray region" between the operating regions, only one of the equations can be valid at a time. We can start with the incrementation aspects of the final equation 15 (i.e., explaining how the operate equation is constructed).

An operation equation of an overcurrent relay can have the basic form of (1):

$$t(I) \geq \left( \frac{a}{\left(\frac{I}{I>}\right)^p - c} + b \right) * k, \quad (1)$$

where
t(I) gives the operate time in seconds
k can be a settable time multiplier of the function
a, b, p, c can be curve parameters
I can be the measured current input to the equation
I> can be the startup threshold value of the current settable by a user.

Equation (1) may be written in form (2):

lp;-1p $$t(I) >= \frac{k * a}{\left(\frac{I}{I>}\right)^p - c} + k * b. \quad (2)$$

Here we can see that the operation time (e.g., the time in which to reach OPERATE state with the assumption of a constant input signal magnitude), can be inversely dependent on current I. Thus, the greater the current is, the shorter the time t to the operation of the relay can be. Curves may be drawn having different parameters in this equation. Such curves may be drawn as a function of constant signal magnitude ratio. However, in practice, the current may fluctuate in time, resulting to a curve implementation with successive integrations.

Equation (2) may be written in form (3):

$$(OT + delayC - k * b) * \left(\frac{I}{I>}\right)^p - c >= k * a, \quad (3)$$

where
OT can be the operation time, and
delayC can be delay compensation.

Operation time denotes the time that has elapsed since the current exceeded the startup threshold value and the device thus performed a state transition to PICKUP state. Delay compensation denotes a system delay, which can be a fully implementational delay when the operation of the device actually starts as calculated from an order to do so. In that case it compensates the measurement delay. Another delay that might be included in this same variable can be an output relay delay that might also be compensated by shortening the calculating operate time. An aspect regarding the delay compensation can be that this parameter remains constant during execution.

When taking into account that the calculation contains several successive integrations, equation (3) may be written as (4):

$$(OT + delayC - k * b) * \sum_{0}^{n} \left( \left(\frac{I}{I>}\right)^p - c \right) >= n * k * a, \quad (4)$$

where
n can be the number of successive execution intervals.

In equation (4), the relation between/and I> (i.e., "current ratio") can be integrated over time. The integration may be carried out in n successive execution intervals. Thereby the fluctuation of the current may be taken into account effectively.

Equation (4) now shows the incrementation aspect of the cumulative counter corresponding to the state transition 3 in FIG. 1. The incrementative counter can be in operation when the current is above the startup threshold.

However, during periods when the current is below the starting threshold setting minus hysteresis, the equation 15 nominator decreases as shown by the internal state transition 10 in FIG. 1. This type of decreasing function, reset function, may be written in form:

$$t(I) >= \left( \frac{tr}{\left(\frac{I}{I>}\right)^{pr} - cr} \right) * k, \quad (5)$$

where
- t(I) gives the reset time in seconds
- k can be a settable time multiplier of the function (the same that is used for operate time calculation)
- tr, pr, cr can be curve parameters
- I can be the measured current inputted to the equation
- I> can be a settable startup threshold value of the current.

The operate condition of an overcurrent protection function can be defined by a term called "start duration", which is a variable that indicates how far from operating the device is at a specific time instant. For example, if the curve operate time calculated from equation (1) has been found to be 1 second for a constant input signal, then starting with this particular input signal magnitude level, after 0.5 seconds the "start duration" has a value of 50% and after 0.75 seconds its value will be 75%. Consequently, "start duration" runs from 0% to 100%, whereby at 0% the device can be reset, and at 100% the device can be configured to operate. The variable "start duration" thus aims to indicate how close to operating the device is if the same constant signal level remains. However, due to signal fluctuation this estimate cannot necessarily be realized. Also, drop-off periods during the operation lengthen the operate time, so that actually the definition of "start duration" may be extended to also include drop-off periods. Then the start duration may be defined as: Start duration=(integrated operate time−integrated reset time)/total operate time. Thus, the state transition DROPOFF→ACTING may take place when the "integrated operate time" minus "integrated reset time"=>0 and PICKUP→OPERATE takes place when (integrated operate time−integrated reset time)=total operate time. On the basis of this condition it may be found out that, while the total operate time in this context is a linear function, the nominator (integrated operate time−integrated reset time) as a derivative of the operate and reset equations has exponentially increasing characteristics, which can be seen in the following.

The integrated operate time of equations (1) to (4) and the integrated reset time of equation (5) may be combined to a single counter as follows.

When the current ratio (I/I>) is abbreviated as M, equation (1) can be written as:

$$t(I) \geq \frac{k*a}{M^p - c} + k*b. \quad (6)$$

Equation (6) may be written, by writing n=>operCounter and including a taskTime (this is a synonym of the previously mentioned execution time/cycle) concept into the equation to get operation inequality (7):

(operCounter+delayC)*Σ(M^p−c)≥Σ(M^p−c)*k*b*1/taskTime+operCounter*k*a*1/taskTime  (7)

By defining timeShift=>delayC*1000/taskTime, k*b*1/taskTime=>curveDelay and k*a*1/taskTime=>curveMult, we get (8):

(operCounter+timeShift)*Σ(M^p−c)≥Σ(M^p−c)*curveDelay+operCounter*curveMult  (8)

Furthermore, the integral cumulative sum Σ(M^p−c) can be defined as sumOfS. These values can be either precalculated with predefined current ratio precision to an operate look-up-table so that it can be a function of M or they can be calculated with a more precise current ratio value during the execution if sufficient computer power is available. Finally we obtain (9):

(operCounter+timeShift)
*sumOfS≥sumOfS*curveDelay+
operCounter*curveMult  (9)

This is a so-called operate counter equation, where the left-hand side parameter can be defined as integTime1 and the right-hand side parameter as integTime2 (these terms refer to the manner they have been calculated, i.e. by integrating the successive terms) so that:

integTime1=(operCounter+timeShift)*sumOfS,  (10)

and integTime2=sumOfS*curveDelay+
operCounter*curveMult.  (11)

With regard to the reset equation, by beginning from (5) and defining similarly with sumOfS another look-up-table item (reset LUT) or calculating directly during the execution a cumulative sum called decOfS≡Σ(M^{pr}−cr) and k*tr*1/taskTime=>resetMult, this leads to reset inequality (12):

Σ(M^{PR}−cr)=decOfS≥k*tr*1/taskTime=resetMult.  (12)

There can also be a so-called resetCounter parameter (equivalent to an operCounter parameter in the operate equation) so that actually, the equation will be (13), where resetCounter can be eliminated:

$$resetCounter * \frac{\sum (M^{PR} - cr)}{resetCounter} \geq k * tr * 1 / taskTime. \quad (13)$$

Now both factors of the "start duration" definition have been calculated in order to show the operate condition. As a result, a combined counter equation can be obtained by combining both operate and reset counter equations as the same equation. Eventually, the start duration value in two counter systems can be calculated as:

$$startDuration = \left( \frac{integTime1}{integTime2} - \frac{decOfS}{resetMult} \right) * 100\%. \quad (14)$$

This expands to be:

(Eq. 15)

$$startDuration = \left( \frac{integTime1 * resetMult}{integTime2 * resetMult} - \frac{decOfS * integTime2}{resetMult * integTime2} \right) * 100\%$$

$$= \left( \frac{(operCounter + timeShift) * sumOfS * resetMult}{(sumOfS * curveDelay + operCounter * curveMult) * resetMult} - \frac{decOfS * (sumOfS * curveDelay + operCounter * curveMult)}{resetMult * (sumOfS * curveDelay + operCounter * curveMult)} \right) * 100\%$$

$$= \left( \frac{(operCounter + timeShift) * sumOfS * resetMult - decOfS * \left( \begin{array}{c} sumOfS * curveDelay + \\ operCounter * curveMult \end{array} \right)}{\left( \begin{array}{c} sumOfS * curveDelay + \\ operCounter * curveMult \end{array} \right) * resetMult} \right) * 100\%.$$

Here, it can now be seen that the operate counter and the reset counter have been combined to a single counter (i.e., "start duration" counter). This "start duration" counter can be in a form having a term in parentheses multiplied by 100%. As a result, the tripping condition for a state transition to the OPERATE state can be at 100% and is reached when the term in the parentheses equals 1. However, as already explained previously, the division in equation (15) is not calculated but the tripping (operating) condition occurs when the nominator value exceeds the denominator value in equation 15. Respectively, a state transition DROPOFF→ACTING state takes place when the nominator decreases to the value zero.

This same equation can also be used for curves, for which some other type of reset equation than an equation-based reset has been chosen. This can simplify the calculation, when many equation terms can be replaced by constants. For example, decOfS has the value zero, causing the second term of the nominator to be zero. Note also that in that particular case, the term resetMult both in the nominator and the denominator may be eliminated.

Another aspect that may be taken into account here is the delay compensation regarding the drop-off timer. If Eq. 7 and Eq. 13 are compared, it may be seen that the delay compensation does not affect the reset operation and thus reset-Counter could be eliminated from the equation. In fact, the delay compensation can also affect the reset counter operation by shortening the reset time so that the actual start output may be deactivated at a correct time. However, this can mean that the reset period calculation should be ended before the function itself has seen that the drop-off period has delayed for a set reset time, and this is not allowed. Thus, in an exemplary embodiment, the delay compensation can be omitted in the reset condition calculation.

In the following, the variables used in the equations are summarized:
  operCounter is a cumulative tick counter for pick-up function.
  timeShift is delayC*1000/taskTime (where delayC may be given in seconds). This represents a fixed value during the pick-up operation.
  curveMult is k*a*1/taskTime. This represents a fixed value during the pick-up operation.
  curveDelay is k*b*1/taskTime. This represents a fixed value during the pick-up operation.
  resetMult is k*tr*1/taskTime. This represents a fixed value during the pick-up operation.
  sumOfS is $\Sigma(M^p - c)$. These values may have been stored in a look-up table (LUT) beforehand. This LUT is called operate-LUT in the following.
  decOfS is $\Sigma(M^{pr} - cr)$. These values may have been stored in a look-up table beforehand. This LUT is called reset-LUT in the following:
Equation 15 may be written out to give:

$$startDuration = 100\% * \left( \frac{\begin{array}{l} operCounter*sumOfS*resetMult + \\ timeShift*sumOfS*resetMult - \\ decOfS*sumOfS*curveDelay - \\ decOfS*operCounter*curveMult \end{array}}{\begin{array}{l} resetMult*sumOfS*curveDelay + \\ operCounter*curveMult*resetMult \end{array}} \right). \quad (Eq.\ 16)$$

In the following, the overflow management of Equation 16 is explained. In a first exemplary embodiment, the denominator can be made smaller. One way to do this is to divide both equation sides by resetMult or some other corresponding divisor. After dividing both sides by resetMult, Eq. 16 may be written:

$$startDuration = 100\% * \left( \frac{\begin{array}{l} operCounter*sumOfS + \\ timeShift*sumOfS - \\ decOfS*sumOfS*\left(\frac{curveDelay}{resetMult}\right) - \\ decOfS*operCounter*\left(\frac{curveMult}{resetMult}\right) \end{array}}{\begin{array}{l} sumOfS*curveDelay + \\ operCounter*curveMult \end{array}} \right). \quad (Eq.\ 17)$$

If the variable curveDelay/resetMult is replaced by BperTR and curveMult/resetMult is replaced by AperTR, the equation may be written as:

$$startDuration = 100\% * \left( \frac{\begin{array}{l} operCounter*sumOfS + \\ timeShift*sumOfS - \\ decOfS*sumOfS*BperTR - \\ decOfS*operCounter*AperTR \end{array}}{\begin{array}{l} sumOfS*curveDelay + \\ operCounter*curveMult \end{array}} \right) \quad (18)$$

A special case, where tr has the value zero, cannot be used to avoid division by zero. The parameter tr value zero actually means an immediate reset equation and consequently, the latter part of eq. 14 will be zero, and as a result, eq. 14 can be given in a more simple form:

$$startDuration = \frac{integTime1}{integTime2} * 100\%. \quad (19)$$

Equation expansion gives then:

$$starDuration = \left( \frac{\left(\begin{array}{l} operCounter + \\ timeShift \end{array}\right) * sumOfS}{\left(\begin{array}{l} sumOfS*curveDelay + \\ operCounter*curveMult \end{array}\right)} \right) * 100\%. \quad (Eq.\ 20)$$

When comparing this equation to Eq. 15, it may be seen that instead of setting resetMult to zero (implying tr to be zero), resetMult has been set to unity. Another question is, if AperTR and BperTr can have too high values when resetMult has been set to a very low value. Actually, highest AperTR and BperTr results when resetMult has its minimum. For very small tr values in Eq. 18, either a and b can be restricted, or alternatively the lowest value of tr or all these three parameters can be restricted. Parameter value range can be specified already in productization phase and, thus, it can be possible to certify already before hand that these execution phase fixed values are restricted. However, it can be possible to use a similar approach like told below with sumOfS and decOfS restriction, if needed, to restrict also AperTR and BperTr.

In Eq. 18, the overflow of the cumulative sums (i.e., sumOfS and decOfS) can be investigated. Another non-fixed parameter during execution in the equation (Eq. 18) is oper-Counter, because the parameters timeShift, curveDelay and curveMult may be fixed during execution.

In the following, an exemplary embodiment of a process for determining a limit value to the cumulative operate sum is described. The process itself can be the same for the cumulative reset sum, too. At first, the LUT item content is investigated in order to find the maximum item value to be inserted to the cumulative sum sumOfS. Operate LUT-equation (and item content) is $M^p-c$, and its fixed point representation depends on the selected integer and fragment bit lengths, where selected bit length can be a sum between the integer and fragment bit lengths. An operate overflow limit can then be calculated by solving inequality $\log_2$(cumulative sum+maximum item value)≤selected bit length for cumulative sum. Now we can select an overflow limit to be smaller than $\log_2$(cumulative sum) and the maximum allowed LUT-insertion value is then a difference between $2^{selectedBitLength}$ and the overflow limit. Similarly, for user programmable curves, parameters p and c maximum value can be selected so that the maximum LUT-value is also restricted. For calculation accuracy point of view it can be feasible to use more fragment bit to LUT-item that is later used in cumulative sum.

In Eq. 18 there is the multiplication sumOfS*decOfS*BperTR. If cumulative sum bit length is assumed to be 28, a 64-bit representation for the multiplication result may be used, if 36 bits are also sufficient for the multiplication value decOfS*BperTR. Of course, these selections can depend highly on selected processor characteristics. In an exemplary embodiment, for example, 22 bits can be reserved for decOfS and 12 bits for BperTR so that in the worst case 28+18+12=58 bits are used here. If now all these three variables have their maximum value, there can still be some margin for overflow. If the signed integer is used for registering, a total number of 63 bits can be used and so 5 additional bits may be used to increase the operate overflow limit and the reset overflow limit.

Thus, the highest possible LUT item and the cumulative sum limit for both operate and reset equation parts can be defined. If, in the operate equation part, the sumOfS is increased over the overflow limit, the sumOfS may be divided by a divisor N. The divisor N can be any number for example, a multiple of 2, such as 2, 4, 8, etc. resulting simple bit-shift in implementation. Then, in the equation the previous sumOfS can be replaced by sumOfS/N. To preserve the value of the equation, all the multiplications in the inequality equation can be divided by N, thus giving:

$$startDuration = 100\% * \left( \frac{\begin{array}{c} operCounter * sumOfS/N + \\ timeShift * sumOfS/N - \\ decOfS * sumOfS/N * BperTR - \\ decOfS * operCounter * AperTR * 1/N \end{array}}{\begin{array}{c} sumOfS/N * curveDelay + \\ operCounter * curveMult * 1/N \end{array}} \right) \quad (21)$$

which may be written as:

$$startDuration = 100\% * \left( \frac{\begin{array}{c} operCounter * sumOfS + \\ timeShift * sumOfS - \\ decOfS * sumOfS * BperTR - \\ decOfS * operCounter * AperTR * 1/N \end{array}}{\begin{array}{c} sumOfS * curveDelay + \\ operCounter * curveMult * 1/N \end{array}} \right) \quad (22)$$

As the original sumOfS has been divided by N, subsequently LUT-item/N should be used instead of a pure LUT-item to keep the equation in shape. If the overflow limit is later exceeded again, the new sumOfS can be sumOfS/N+N) when compared to the original equation value. Then, the inserted LUT value will be LUT item/(N+N), accordingly. By this way, overflow may be avoided.

To address overflow of decOfS, similar operations as above for sumOfS can be made but now decOfS can be replaced by decOfS/L, where a good choice for L is also 2, and the next good alternatives are 4, 8 etc. L may also equal N. In this case, Eq. 18 gives:

$$startDuration = 100\% * \left( \frac{\begin{array}{c} operCounter * sumOfS * 1/L + \\ timeShift * sumOfS * 1/L - \\ decOfS/L * sumOfS * BperTR - \\ decOfS/L * operCounter * AperTR \end{array}}{\begin{array}{c} sumOfS * curveDelay * 1/L + \\ operCounter * curveMult * 1/L \end{array}} \right) \quad (23)$$

When replacing decOfS/L=>decOfS, it can be continued from the equation:

$$startDuration = 100\% * \left( \frac{\begin{array}{c} operCounter * sumOfS * 1/L + \\ timeShift * sumOfS * 1/L - \\ decOfS * sumOfS * BperTR - \\ decOfS * operCounter * AperTR \end{array}}{\begin{array}{c} sumOfS * curveDelay * 1/L + \\ operCounter * curveMult * 1/L \end{array}} \right) \quad (24)$$

Also here it can be continued with successive divisions (actually bit shifts) by Las in the case of the operate sum. Correspondingly, the inserted LUT values can also be divided by L, L+L and so forth.

The combined equation can be written as:

$$startDuration = 100\% * \left( \frac{\begin{array}{c} operCounter * sumOfS * 1/L + \\ timeShift * sumOfS * 1/L - \\ decOfS * sumOfS * BperTR - \\ decOfS * operCounter * AperTR * 1/N \end{array}}{\begin{array}{c} sumOfS * curveDelay * 1/L + \\ operCounter * curveMult * 1/(N * L) \end{array}} \right) \quad (25)$$

Figure 2:
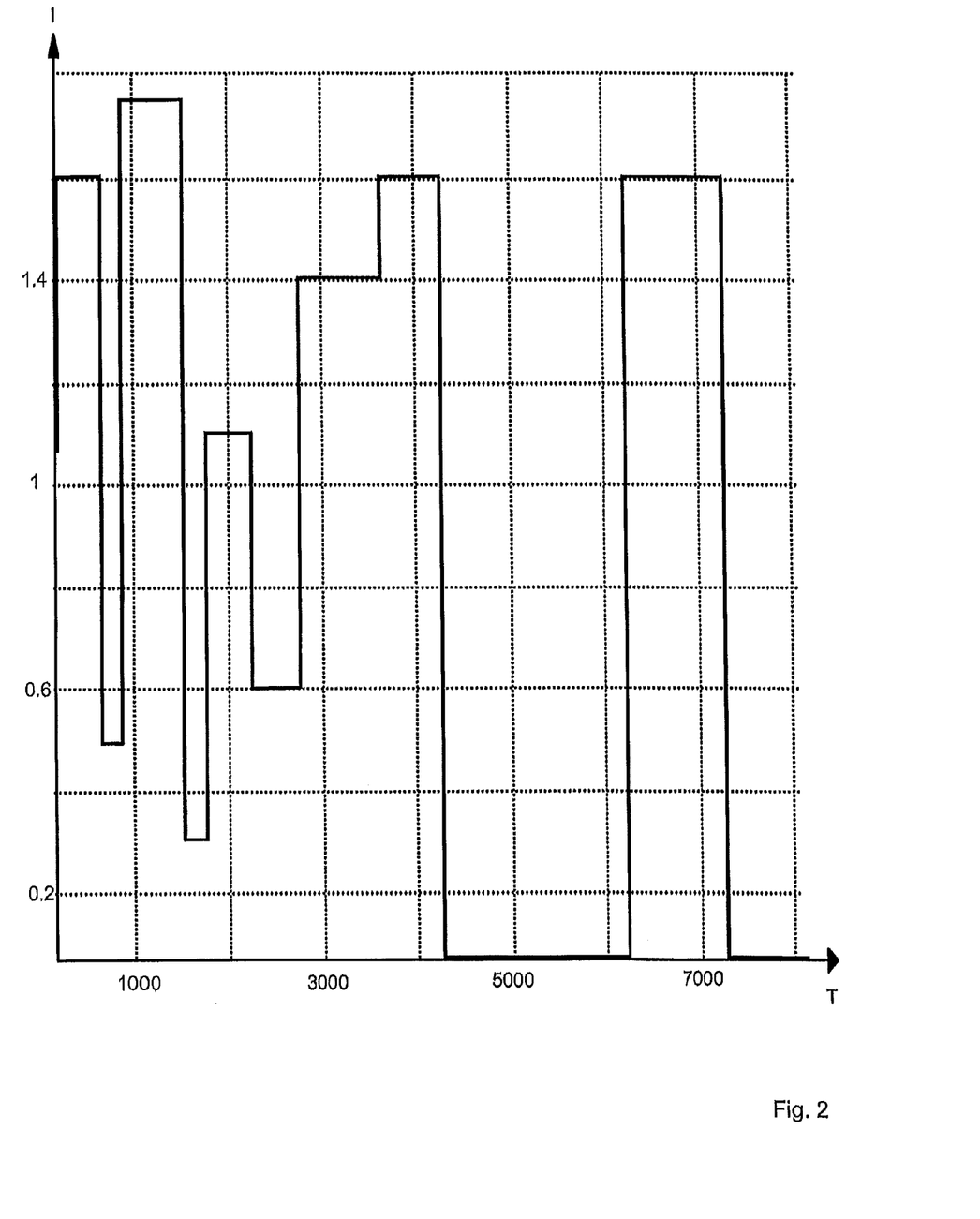
FIG. 2 shows another exemplary embodiment of a state diagram of an electronic device.
Figure 3:
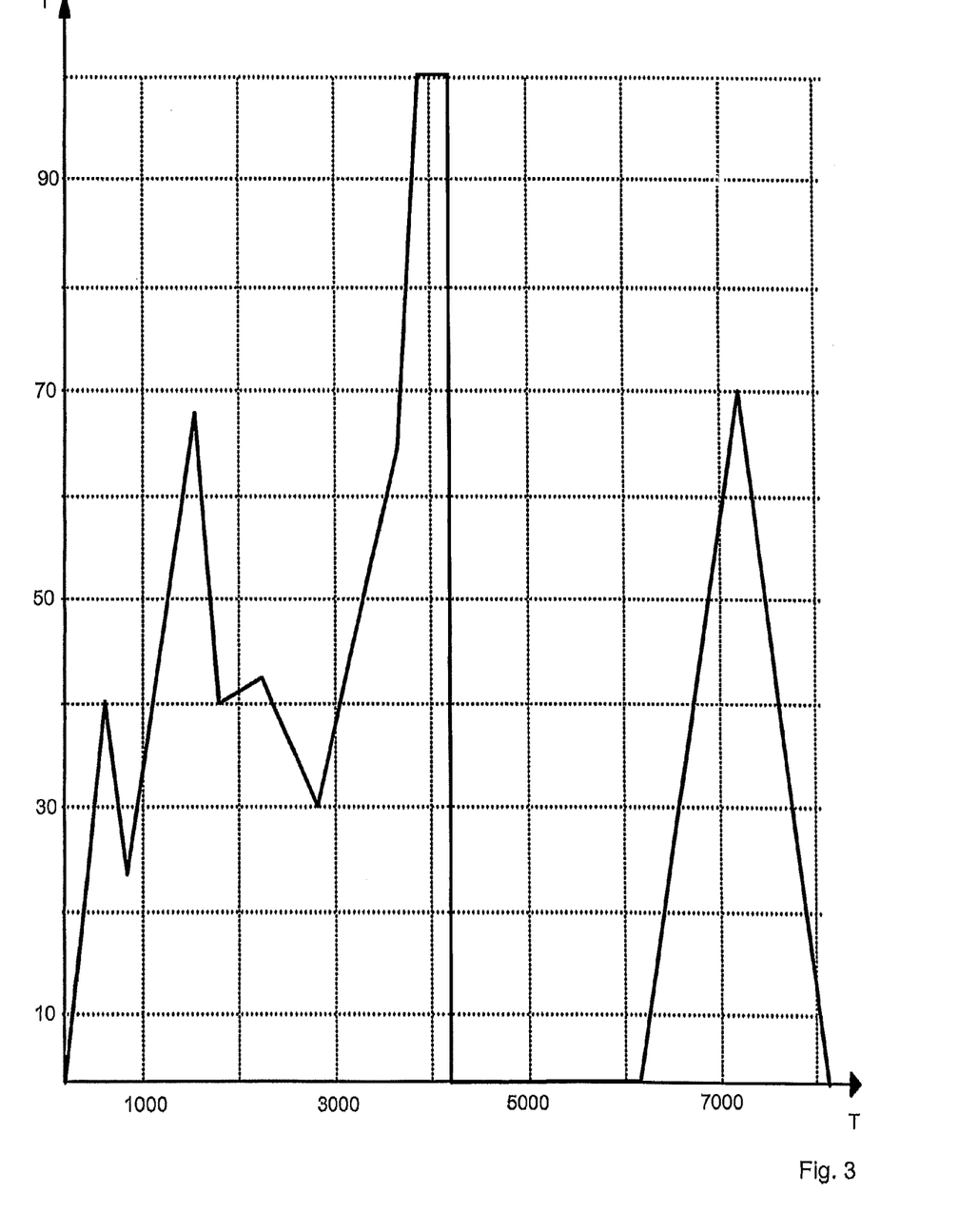
FIG. 3 shows an example of dependence of the signal magnitude on time.

FIGS. 2 and 3 show the current ratio I/I> varying in time T (FIG. 2) and the respective cumulation of the start duration value (FIG. 3) in accordance with the fluctuation of the current in FIG. 2. It is noted that the example situation depicted in FIG. 2 corresponds to an ideal situation where the current levels change abruptly.

In FIG. 2, the current ratio level "1" depicts a startup threshold level, that is a level where a state transition ACTING→PICKUP occurs in accordance with FIG. 1. Values greater than 1 depict the operate situation, where the equation 15 ratio value increases. Before 4000 ms, operate periods thus occur in time intervals 0 . . . 610, 870 . . . 1550, 1770 . . . 2250 and change in the signal level at the moment 3670 ms. Values lower than 1 depict the reset situation where the startup counter value decreases. Before 4000 ms, reset periods thus occur in time periods 610 . . . 870, 1550 . . . 1770, 2250 . . . 2800. Referring to the state diagram of FIG. 1, at the moment 0 ms the apparatus performs a state transition to PICKUP state and stays in the PICKUP state until 610 ms has elapsed, whereafter a state transition to DROPOFF state can be performed.

FIG. 3 shows the value of the startup duration counter as a function of time in the situation of FIG. 2. It may be seen that the value of the startup duration increases during the operate periods, such as 0 . . . 610 ms, and decreases during the reset periods, such as 610 . . . 870 ms. The figure also shows that a trip condition occurs at a moment 3900 ms, when the startup counter value reaches 100% and the state machine goes to OPERATE state. When the current falls below the threshold value "1-hysteresis" (which has been 2% in this simulation) after reaching OPERATE, the device goes to ACTING state.

In FIG. 3, the OPERATE condition occurs, referring to equation (15), when the clause in parentheses reaches "1", that is the nominator becomes as great as or greater than the denominator. When the state transition OPERATE→ACTING occurs, equation (15) parameters can be reset to zero. When the simulation continues, a new start takes place in 6200 but after the state transition ACTING>DROPOFF occurs, and the nominator in equation (15) falls gradually to zero. After reaching the value zero, the state transition DROPOFF→ACTING takes place in 8100.

Figure 4:
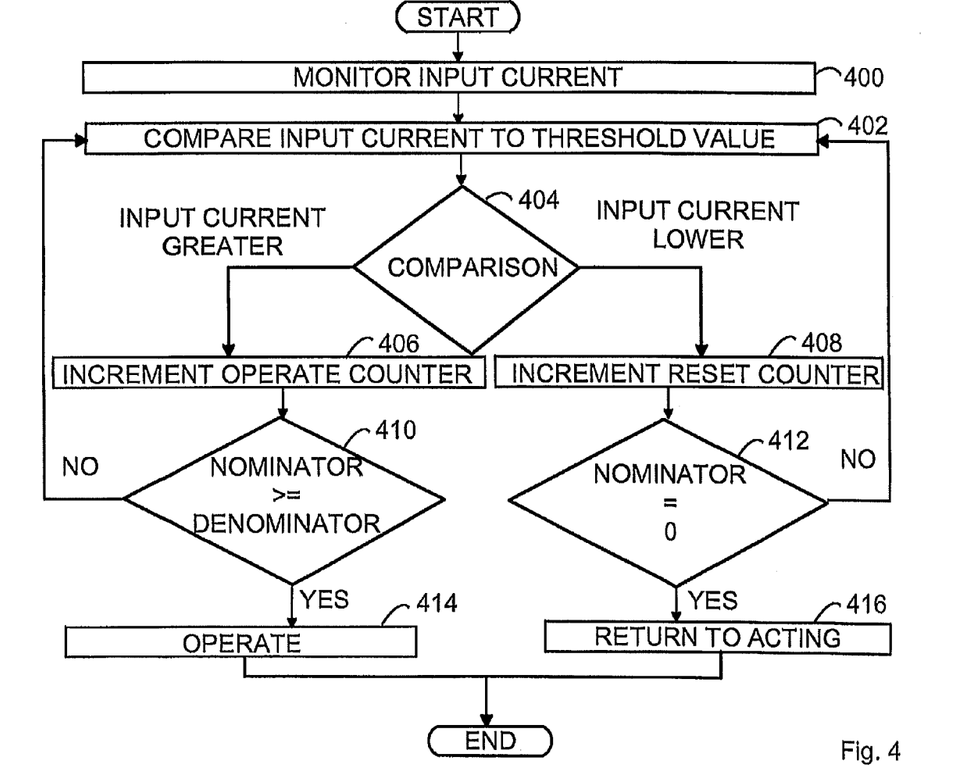
FIG. 4 shows an exemplary embodiment of a method according to the disclosure.

FIG. 4 shows an exemplary embodiment of a method. The method may be implemented in an overcurrent relay applying an IDMT (Inverse Definite Minimum Timer) principle.

In 400, the relay monitors the input current, and in 402, the input current can be compared to a startup threshold of the relay protection function. If the outcome of the comparison indicates that the input current is greater than the threshold, the method proceeds to 406 where sumOfS and operCounter counters can be incremented. Correspondingly, if the comparison 404 indicates that the input current is lower than the startup threshold minus the hysteresis value, the decOfS counter can be incremented in 408. At the incrementation 406, it is checked in 410 whether the equation 15 nominator exceeds the denominator value. If this is the case, the device starts to operate in 414. At the incrementation 408, a check 412 can be carried out to determine whether the equation 15 nominator has gone down to 0. If yes, then the device goes to ACTING state. After reaching OPERATE, when the input current undershoots the startup threshold minus the hysteresis next time, a state transition to ACTING state takes place. Alternatively, if reset is after OPERATE based on a reset equation, the method proceeds to ACTING when equation 15 nominator has gone down to 0.

The counters processed in the exemplary method can be arranged into a form, in which the checking of the operate condition can be carried out by a simple comparison of two measures. In equation (15) these two measures have been placed in the nominator and denominator. However, in equation (15), the denominator may be multiplied to the right-hand side of the equation, whereby again the tripping condition can be performed by a comparison of the two sides of the equation. By this way, no divisions, which take a lot of processing capacity of the computer of the relay, need to be carried out.

Figure 5:
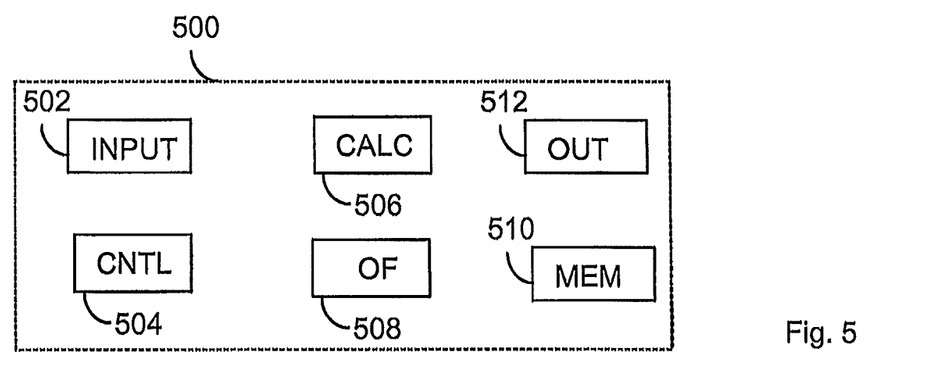
FIG. 5 shows an exemplary embodiment of an apparatus according to the disclosure.

FIG. 5 shows a protection relay 500 showing only portions relevant to the disclosure. The relay includes an input means represented as any input device or devices, and illustrated as an exemplary input port 502 for inputting a characteristic measure, such as current, voltage or frequency. The relay also includes a means for determining, which can be any suitable controller such as a control unit 504 configured to control the operation of the device. The control unit can be implemented as a processor, and the functionalities can be implemented onto the processor by software, for example.

FIG. 5 also shows a calculating 506 unit, which can update a calculation equation upon the input characteristic measure. The relay can also include a module 508 responsible for overflow management of the calculation equation. A memory 510 can also be provided for storing LUT table items for use by the calculation equation. Instead of having a separate memory for lookup tables, the values can also be calculated during execution. All these functionalities 506 to 510 can, instead of separate units, be implemented on the control unit, such as a processor. The device can also include an output unit 512 for providing an output signal. The output signal can be dependent on the outcome of the result of the calculation equation. If, for instance, the calculation equation shows that a tripping or reset condition has been reached, the output unit provides the respective output signal.

In the exemplary embodiments, the reset functionality can be embedded in the implementation such that the accuracy of the calculation can be kept good. The exemplary embodiments can provide an accurate way to implement an inverse definite time operation to calculate the operation time from the equations themselves. The exemplary embodiments can also provide a way to reduce computational complexity by avoiding divisions when making real time computations. The only calculation operations needed are multiplications, additions and subtractions.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of controlling a protection relay, comprising; inputting an input characteristic quantity; and determining a triggering condition for the protection relay based on a value of a calculation equation, wherein for an overfunction measure the value increases when the input characteristic quantity exceeds a first threshold value and decreases when the input characteristic quantity undershoots a second threshold value, wherein for an underfunction measure the value of the calculation equation increases when the input characteristic quantity undershoots a first threshold value and decreases when the input characteristic quantity exceeds a second threshold value, wherein the calculation equation includes a first measure and a second measure, and wherein triggering occurs when the first measure is greater than the second measure.

2. A method according to claim 1, wherein the calculation equation is arranged into a form of a division, where the first measure is arranged as a nominator of the division and the second measure is arranged as a denominator of the division.

3. A method according to claim 1, wherein the second threshold value is obtained by reducing a hysteresis setting from the first threshold value for an overfunction measure, and by adding a hysteresis setting to the first threshold value for an underfunction measure, a region between the first threshold value and the second threshold value defining a hysteresis region in which calculation of the calculation equation is stopped.

4. A method according to claim 1, wherein the calculation equation includes at least one cumulatively increasing sum term which is increased upon a predetermined condition, and a predetermined maximum value is defined for the at least one sum term, and wherein the sum term is divided by a divisor if the sum term reaches the maximum value.

5. A method according to claim 4, wherein sum term values are indexed in a look-up table at pre-defined intervals as a function of the characteristic measure, and upon reaching a cumulative sum maximum value, the indexed look-up-table sum term is divided by the same divisor as the cumulative sum itself.

6. A method according to claim 5, wherein the pre-determined maximum value differs between different sum terms.

7. A method according to claim 5, wherein the intervals between the look-up table indices vary stepwise, such that more indices are located in an abrupt part of a curve representing the sum term values as a function of the indices.

8. A method according to claim 1, comprising:
monitoring at least one variable in the calculation equation, and comparing the value of each of the at least one variables to a predetermined threshold value of the variable, and reducing each term in the calculation equation similarly, if a variable reaches its threshold value.

9. A protection relay, comprising;
means for inputting an input characteristic quantity; and
means for determining a triggering condition for the protection relay based on a value of a calculation equation, wherein for an overfunction measure the value is configured to increase when the input characteristic quantity exceeds a first threshold value and to decrease when the input characteristic quantity undershoots a second threshold value, wherein for an underfunction measure the calculation equation is configured to increase when the input characteristic quantity undershoots a first threshold value and to decrease when the input characteristic quantity exceeds a second threshold value, wherein the calculation equation includes a first measure and a second measure, and wherein triggering occurs when the first measure is greater than the second measure.

10. A protection relay according to claim 9, wherein the calculation equation is arranged into a form of a division, where the first measure is arranged into a nominator of the division and the second measure is arranged into a denominator of the division.

11. A protection relay according to claim 9, wherein the second threshold value is obtained by reducing a hysteresis setting from the first threshold value for an overfunction measure, and by adding a hysteresis setting to the first threshold value for an underfunction measure, a region between the first threshold value and the second threshold value defining a hysteresis region in which calculation of the calculation equation is stopped.

12. A protection relay according to claim 9, wherein the calculation equation includes at least one cumulatively increasing sum term, which is increased upon a predetermined condition, and a predetermined maximum value is defined for the at least one sum term, and wherein the sum term is divided by a divisor if the sum term reaches the maximum value.

13. A protection relay according to claim 12, wherein sum term values are indexed in a look-up table at pre-defined intervals as a function of the characteristic measure, and upon reaching a cumulative sum maximum value the indexed look-up-table sum term is divided by the same divisor as the cumulative sum itself.

14. A protection relay according to claim 12, wherein the predetermined maximum values differ between different sum terms.

15. A protection relay according to claim 12, wherein the intervals between the look-up table indices vary stepwise, such that more indices are located in an abrupt part of a curve representing the sum term values as a function of the indices.

16. A protection relay according to claim 9, wherein at least one variable is monitored in the calculation equation, and the value of each of the at least one variables is monitored to a predetermined threshold value of the variable, and each term in the calculation equation is similarly reduced if a variable reaches its threshold value.

* * * * *